June 17, 1930.  J. DEARMANN  1,764,096
FUEL MIXER
Original Filed July 31, 1925
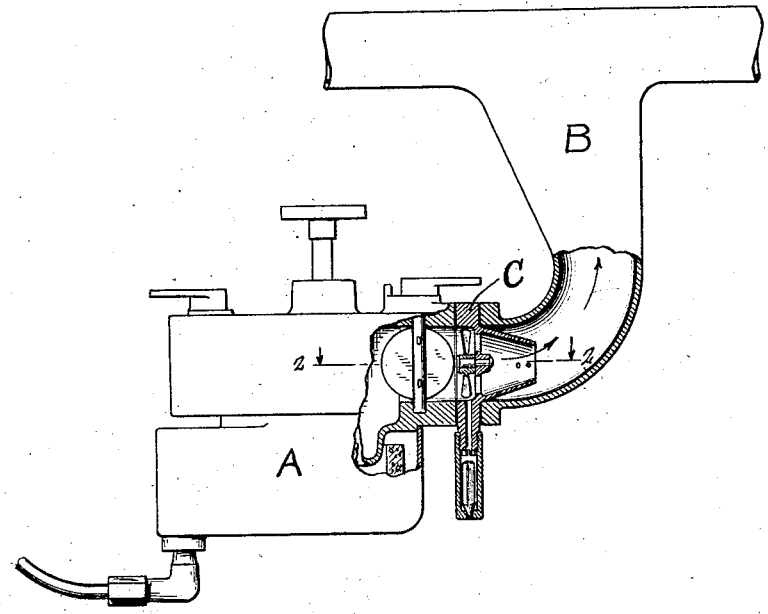
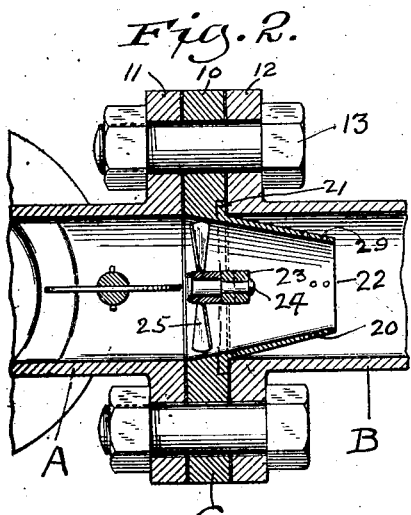
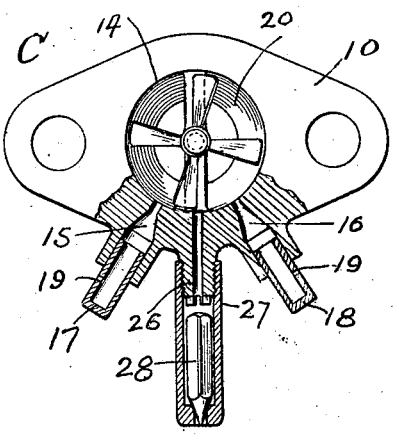
INVENTOR.
JAMES DEARMANN,
BY
ATTORNEYS.

Patented June 17, 1930

1,764,096

UNITED STATES PATENT OFFICE

JAMES DEARMANN, OF MILWAUKEE, WISCONSIN, ASSIGNOR TO NICHOLAS A. BOEHM AND SAMUEL ROSEN, BOTH OF MILWAUKEE, WISCONSIN

FUEL MIXER

Application filed July 31, 1925, Serial No. 47,280. Renewed April 28, 1930.

The invention is embodied in an accessory unit designed to be inserted in the connection between the carburetor and the manifold of an internal combustion engine of a mobile vehicle.

The invention resides in an automatically operating device which is responsive only to an increased rate of movement of the automobile, whereby when the predetermined maximum normal speed at which the automobile operates is exceeded, a greater quantity of air will be admitted into the manifold to reduce the mixture which is drawn into the combustion chambers of the engine, the quantity of air in such mixture being increased without perceptibly increasing the quantity of the fuel, so that the fuel consumption is lessened and properly proportioned to the increased rate of speed of the automobile. This action thus reduces proportionately the actual fuel content of the mixture while maintaining and even increasing the volume of the charge, so as to give a better compression, and in practical operation it effects a great saving in the consumption of fuel when the automobile is operated at a high speed.

The auxiliary air supplying device is constructed so as to be inoperative and at rest until the speed of the automobile attains a predetermined maximum normal rate of operation. But when the rate of such maximum normal speed is attained, the auxiliary device becomes operative, and thereafter as the speed increases, the auxiliary air supplying device is correspondingly actuated so as to admit additional air, without unduly increasing the flow of fuel. Hence, the flow of fuel and air to constitute the fuel mixture is equalized and properly proportioned to the varying speeds of the automobile whenever such speeds are in excess of the rate of the maximum, normal operation.

The mixture of fuel and air is therefore not varied until after the maximum, normal speed has been attained in the operation of the automobile.

The details of construction whereby these results are secured, together with other features residing in the invention, will now be particularly described, and the novelty residing in the whole be pointed out in the appended claims.

In the accompanying drawing:

Figure 1 is a view in side elevation showing a carburetor and a portion of the manifold, with the auxiliary device in position in the connection between the parts, some of the parts being shown in vertical section for the purpose of clearness.

Figure 2 is an enlarged horizontal sectional view on the line 2—2, Figure 1.

Figure 3 is a like enlarged view in elevation, partly in vertical section, of the auxiliary device, looking from the left of Figure 1.

In the drawing, the carburetor is indicated by A, the manifold by B, and the unit embodying the present invention by C.

In its complete construction, the unit C comprises a flanged or eared plate 10, which as shown, is adapted to be inserted between the flanges or ears 11 and 12 respectively, of the elements A and B, and secured in fixed position by means of bolts 13, passed through perforations in the three parts. A transverse opening 14, centrally of the plate 10, is aligned so as to form a continuous passage from the carburetor to the manifold.

The lower edge of the plate 10 is bored as at 15 and 16, to provide inlets for admitting through reduced compressing apertures at the inner ends of the bores fixed quantites of air to the opening 14. Such bores may be provided with removable hollow plugs 17 and 18, seated with a driving fit in the bores, and apertured at 19 for the admission of air in quantities and at a rate determined by the size of the apertures.

While the hollow plugs are not essential to the successful operation of the invention, and may be omitted, their use, when replaceable by others provided with apertures of different size, will enable a more exact control of the fuel mixture used in the maximum, normal operation of the automobile to be effected. In explanation of the meaning of the expression "maximum, normal operation" as herein used, I may say that such expression is applied by me to any speed in a Ford car up to twenty miles per hour, without variation in the proportions of the mixture.

The reduced apertures forming constrictions at the termination of the bores 15 and 16, act with compression upon the air drawn therethrough, and lead into the transverse opening 14 in the plate 10. A tapering tube 20, flanged at its larger end, as at 21, is seated with the flange in a circular recess formed in that side of the plate 10 which adjoins the manifold, with the smaller end 22 of the tube projecting into the passage in the manifold, and positioned some distance from the walls of such passage. This relative arrangement of the smaller end 22 of the tube forms underneath the same a trap in which the fuel in the manifold at the time that the engine is shut off will run back and be collected and retained. The presence of a small quantity of fuel at that point is of material assistance in starting the engine, inasmuch as it is drawn through the manifold with the first inrush of air, and renders the engine more immediately responsive to the action of the starter.

The larger end of the tapering tube 20 is provided with a cross piece 23, supporting a fixed pin 24, on which is mounted for rotation a fan 25, the blades of which when set in motion by the draft through the said tube serve to break up the fuel and contribute to its more complete vaporization.

The plate 10 is provided, in the construction shown, with a depending nipple 26, which has an axial bore leading to the transverse opening 14. The lower end of the nipple is threaded so as to permit connection therewith of the upper end of a short tubular member 27 having a longitudinal chamber, partially closed at its lower end, but provided with a valve seat which receives the tapering end of a valve plug 28, arranged for vertical movement within the chamber of the tubular member 27. The construction here described is merely one form of possible arrangement at the lower side of the plate 10, whereby a chamber is provided to support the valve plug 28. The valve plug 28 is influenced by gravity to seat itself and normally close the valve opening in the member 27, leading from the atmosphere to the hollow of the said member.

In the ordinary operation of the automobile at any speed up to the maximum normal, the valve plug 28 remains at rest in its seat and closes the chamber in the tubular member 27 to the admission of air. But when the movement of the automobile exceeds the maximum, normal rate of speed, which I have set at twenty miles per hour with a Ford car, the inrush of the fuel mixture into the manifold creates a draft which will lift the valve plug 28 from its seat in the chamber and permit an additional quantity of air to be admitted through the chamber to the manifold. And as the speed of the automobile increases, the valve plug 28 is further lifted to enlarge the valve opening, and a corresponding increase in the quantity of additional air admitted, takes place. In a series of actual tests with a Ford automobile equipped with one of the devices embodying my invention, and operated at a speed of thirty miles per hour, I have been able to operate the car considerably in excess of fifty miles per gallon of fuel. On a transverse line, the hollow chamber in the tubular member 27 is circular, while the valve plug 28 is in the form of a polygon, to permit passage of the air at its sides.

The constricted outlet formed at the smaller end of the tapering tube 20 agitates the vaporized fuel drawn through it, and conduces to a more complete mixture thereof. Perforations 29 in the generally imperforate tube 20 near its smaller end, also contribute to the better vaporization of the fuel as particles thereof are forced to pass therethrough.

Having thus described my invention, what I claim and desire to secure by Letters Patent of the United States, is:

1. In an auxiliary air supplying device for an internal combustion engine, a plate having a transverse opening for alignment with the passages connecting the carburetor and manifold, the said plate having affixed at one side a tapering generally imperforate tubular member extending into the passage of the manifold, and a normally closed air passage leading to the said transverse opening, with a movable valve plug for effecting such closure.

2. An auxiliary air supplying device for insertion in the connection between the carburetor and manifold of an internal combustion engine, the said device comprising a plate having a transverse opening for alignment with the passages of the said parts, and having at one side a tapering tubular member extending into the passage of the manifold, and a depending tubular member provided with a passage leading to the transverse opening, with a vertically movable valve plug acting normally to close the passage against the movement of air, but adapted to be lifted by inrushing air pressure to permit additional air to pass therethrough, and a rotating fan positioned within the said tapering tubular member and actuated by the air draft to break up the fuel.

3. In an auxiliary air supplying device for an internal combustion engine, a plate having a transverse opening for alignment with the passages connecting the carburetor and the manifold, the said plate having affixed at one side a tapering tubular member imperforate except at its smaller end extending into the passage of the manifold, and a normally closed air passage leading to the said transverse opening, with a movable valve plug for effecting such closure of the air passage.

4. In an auxiliary air supplying device for an internal combustion engine, a flanged plate disposed between the carburetor and the manifold and provided at one side with a tapering generally imperforate tubular member the free end of which is to be entered in the manifold, the said plate and tubular member having a through opening for the passage of the fuel mixture from the carburetor, an auxiliary air passage leading into the said through opening, and movable means for normally closing the said air passage, such means being moved by the inrush of auxiliary air drawn through said passage.

In testimony whereof, I have signed my name at Milwaukee, this 23d day of April, 1925.

JAMES DEARMANN.